United States Patent Office 2,962,020
Patented Nov. 29, 1960

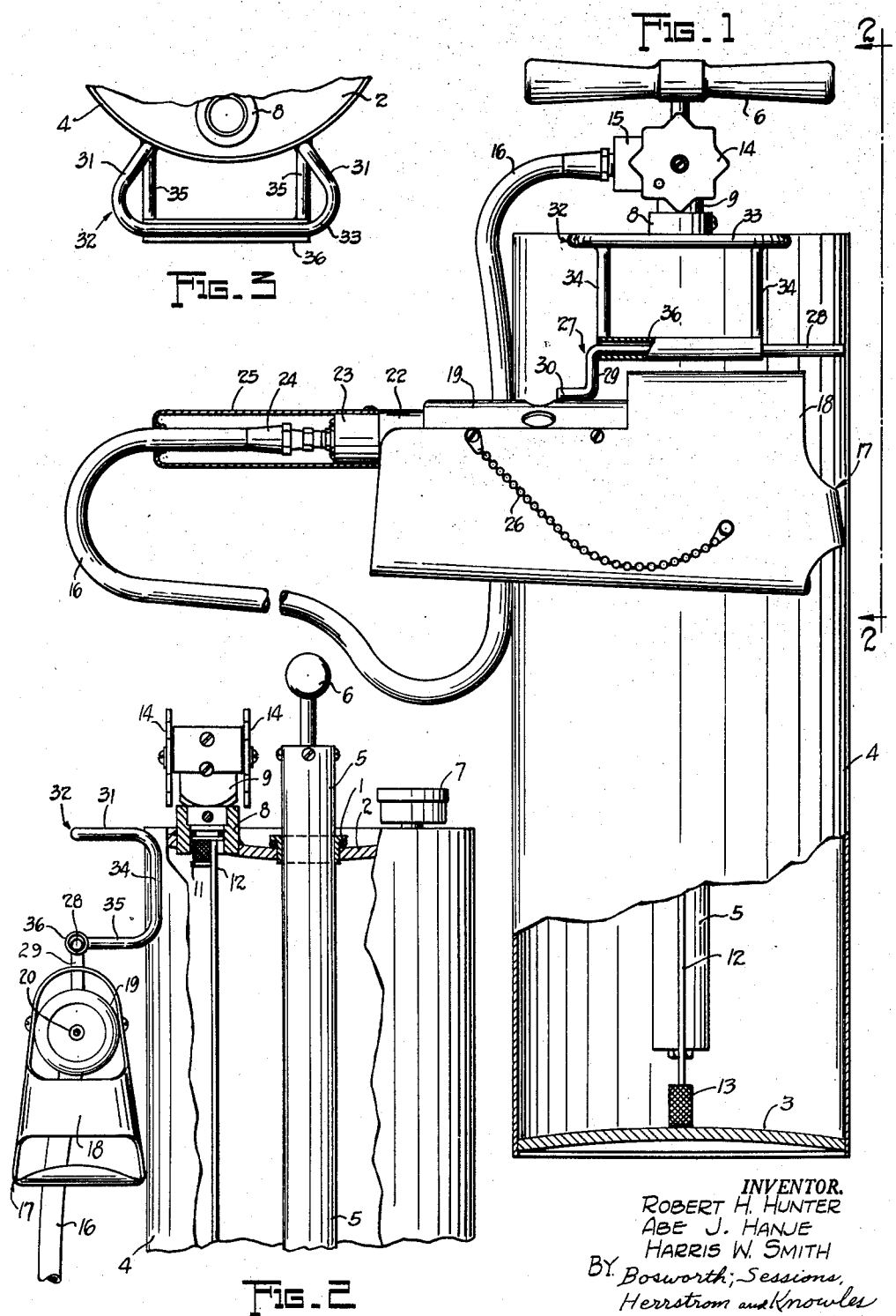

2,962,020

SEPARABLE TORCH HEAD AND FUEL SUPPLY TANK

Robert H. Hunter, Epping Road and Old Mill Road, Gates Mills, Abe J. Hanje, Northfield, and Harris W. Smith, Bainbridge, Ohio; said Hanje and said Smith assignors to said Hunter Filed Feb. 17, 1958, Ser. No. 715,661

19 Claims. (Cl. 126—271.2)

This invention relates to a fuel-burning torch, particularly a torch provided with a burner assembly connected by an extension tube to the fuel reservoir.

In the military service, particularly in cold climates, it is sometimes necessary in the interests of saving time to use a fuel-burning torch in starting the engine of a vehicle, tank, airplane or the like. As a rule, the part or parts that must be heated can best be reached if the torch is provided with an extension tube. In such case, the fuel reservoir may be permitted to rest on the ground or on a supporting platform of suitable height during the time that the flame in the burner assembly is brought into contact with the part or parts to be heated. The flexibility of such an arrangement affords important advantages as compared with the inflexibility of a fuel-burning torch of the type in which the burner assembly is fixedly mounted on the fuel reservoir. On the other hand, a fuel-burning torch equipped with an extension tube is often awkward to handle, particularly when it is being moved from place to place.

The invention has for one of its objects to provide a fuel-burning torch equipped with an extension tube in which provision is made for supporting the torch head on the fuel reservoir when the torch is not in use. It is poor practice to permit the torch head to rest on the ground, where it may easily be damaged. If there is flame in the burner assembly, it is necessary to keep it from coming into contact with a wooden structure, as, for example, a supporting platform of wood. As a practical matter, it is usually necessary that provision be made for mounting the torch head on a metal support of some kind. The fuel reservoir itself can be used for this purpose and it is so used according to the teachings of the present invention.

On way in which this can be done involves providing the torch head with a catch by which to attach it to the fuel reservoir. This has the disadvantage that an operator wearing gloves is handicapped when it comes to releasing the catch by which the torch head is held in position. When it becomes necessary to detach it, it is desirable that the torch head be so held that it can be easily and quickly removed by an operator wearing heavy gloves. It is also desirable that it be of such design that it is a simple matter for the user to attach it to the fuel reservoir.

The invention has for another of its objects to provide a lifting device for a fuel-burning torch in which device means for supporting the torch head are incorporated. For obvious reasons it is undesirable that the grasping portion of the lifting device; e.g., the part in or on which the hand is placed when the torch is carried from one place to another, be reduced in size as a result of the introduction into it of the torch head support. This problem the present invention obviates by providing means associated with the lifting device by which the torch head may be supported in a zone somewhat removed from the grasping portion.

A further object of the invention is to provide a combined handle and supporting device of a kind such that the fuel reservoir, etxension tube and torch head may, if desired, be carried by one hand, leaving the other hand free for other purposes. This would not be possible if the torch design were such as to make it necessary for the person moving the torch to carry the torch head in one hand and in the other the fuel reservoir. If, as is sometimes desirable, the torch is provided with two such handles, each diametrically opposed to the other, it is a particularly simple matter for two men to carry the torch between them, each using one hand on one of the two gasping portions. Each then has one hand free to use as needed.

Other objects, advantages and features of the invention will be apparent from the description which follows and from the accompanying drawings, in which:

Figure 1 is a side elevation with parts broken away of a fuel-burning torch incorporating the features of the invention;

Figure 2 is an elevation of the same torch as seen from line 2—2 of Figure 1, certain of the parts being broken away or in section to reveal the interior construction; and Figure 3 is a top plan of the fuel reservoir before installation of the controls, extension tube and torch head.

The torch is best seen in Figure 1 and may be of the type described and claimed in prior applications for patent, Serial No. 457,803, filed September 23, 1954 for Instant Flame Torch; Serial No. 479,074, filed December 31, 1954, for Thermostatically Controlled Liquid Fuel Burner; and Serial No. 654,322, filed April 22, 1957, for Extension Tube Torch. Among other things it consists of a fuel reservoir or tank made up of a top 2 that is dished downwardly, Figure 2, a bottom 3 that is dished upwardly, Figure 1, and side walls 4 of generally cylindrical contour. In top 2 is a filler opening provided by a metal collar 1 suitably secured in a central opening in the top and adapted to receive in removable relation a pump assembly 5 having a handle 6. Secured to and supported by the top 2 on one side of the pump 5 is a pressure gauge 7; on the other, a cylindrical mounting tube 8. In the latter is supported a chambered mixing block 9 which communicates with the fuel and air portions of the tank 4 through separate conduits and passages and is provided with controls by which air, fuel, or a mixture of both is supplied to nozzle 20 of the burner assembly in the torch head.

At the lower end of the mixing block 9 is an air filter 11, supported as by a depending air tube or, as shown in Figure 2, attached to the mixing block just below the level of the top 2 of the tank. Depending from the mixing block 9 is a fuel tube 12 at the lower end of which, and at the bottom of the tank, is a fuel filter 13. The passages mentioned for admitting the air and/or fuel to a suitable mixing chamber (not shown) are formed in the mixing block 9. These passages and the mixing chamber to which they lead, also in the block, are shown and described in copending application for patent Serial No. 747,411, filed July 9, 1958, for Mixer for Air and Liquid Fuel Torch.

Star wheels 14, each attached to a metering plug, control the flow of air and/or fuel to the mixing chamber in accordance with the disclosure in copending application for patent Serial No. 747,411, filed July 9, 1958, for Mixer for Air and Liquid Fuel Torch. Extending from the forward face of mixing block; i.e., the face opposite that seen in Figure 2, is a mounting base 15, see Figure 1. This mounting base is detachably coupled to the mixing block, preferably by means of the quick-attachable type as in copending application Serial No. 654,322, filed April 22, 1957, for Extension Tube Torch. From mounting base 15 a flexible extension tube 16 runs to the torch head generally designated 17 and located at the remote end of the extension tube 16. It consists, among other things, of flame shield 18, burner tube 19, and nozzle 20; a neck 22, shown only in Figure 1, forms part of burner tube 19.

Coupled to the neck 22, preferably by means of the quick-attachable type, is a mounting base 23. To it is fastened a fitting 24 fast on the end of the extension tube 16. Fastened to mounting base 23 is a cylindrical gripping tube or handle portion 25, normally held in one hand when the torch is in operation. The user's other hand may, if desired, and to help support the torch head, grasp a chain sling 26, which at its ends is fastened to spaced points of the flame shield 18. Thus neither hand comes into contact with those portions of the torch head that are heated to high temperatures.

Fast on the top of the burner assembly as shown in Figure 1 is a Z-shaped mounting element or support 27. This support is characterized by a long top leg 28 which parallels the axis of the burner tube 19, a short or connecting part 29 that extends at right angles to the long leg, and an attaching or short leg portion 30. The latter is brazed or welded to the surface of the burner tube. In the preferred embodiment of the invention, the support or hanger 27 takes the form of a rod so bent that portions 28 and 30 are offset from each other.

Mounted on the tank near the top of the side walls 4 is a lifting device 32 comprising a skeleton handle of open construction. Grasping portion 33 of the handle 33 is somewhat removed from the tank so that the fingers of a person carrying the torch may be inserted between the grasping portion and the tank. Seen from above, as in Figure 3, the handle is U-shaped, being located in a horizontal plane at the top of the tank.

The ends of the grasping or handle portion 33 are connected by integral bar portions 31 to the upper ends of integral depending anchoring portions 34 secured as by welding to spaced points of the tank wall 4. Some distance below the horizontal plane of the handle grasping portion 33 the anchoring portions 34 turn outwardly away from the tank, the rod ends thus providing outwardly angled terminal portions 35. The lifting device 32 is thus fastened to the tank by means of the spaced parallel vertical portions 34 which engage the side walls of the tank.

The outwardly angled terminal portions 35 have ends abutted against an attaching member comprising a tube 36 which interconnects the spaced ends of the terminal rod portions 35. The attaching member 36 constitutes a tubular receptacle open at both ends and throughout its length to enable it to receive the straight element 28 or rod of the burner assembly hanger. This receptacle is welded or brazed to the ends of the outwardly angled portions 35 in horizontally offset relation to the tank 4. The attaching device 36 may be angled downwardly for gravity retention of the burner support 27, although for most applications of the level or horizontal arrangement shown is to be preferred.

When the torch is about to be put into use, the burner assembly support hanger 27 is disengaged from the attaching device or receptacle 36 by sliding the leg 28 rearwardly out of the receptacle. Thereafter the burner assembly may be moved about and used without regard to the fact that it incorporates means by which torch head 17 can be mounted on the tank. When its operation is no longer required, it is a simple matter for the operator to remount or re-locate the torch head 17 on the tank by re-inserting the leg 28 of the burner assembly support 27 in the tubular receptacle that constitutes the attaching device 36. It will remain in place as long as the torch as a whole remains upright.

With the torch hung from the combination handle and receptacle, the complete assembly may be carried from place to place by means of the lifting device 32. It will be noted from Figure 2 that normally the torch head hangs suspended in proximity to, but not in actual engagement with, the side walls of the tank. Under some conditions, as where the torch is tilted slightly in the clock-wise direction, seen as in Figure 2, the torch head 17 will swing against and will be steadied by contact with the side walls of the tank. There is little opportunity for interference from the torch head in view of the manner in which it is carried by the tank.

One such lifting device on the tank will suffice. However, if desired, two of them may be mounted on diametrically opposed sides of the tank. In such case a torch with its full capacity of fuel may be carried by two men, one using his left hand on one handle and the other his right hand on the other handle. If only one man is available or needed, the torch may be carried by either of its two handles, as may be most convenient.

It is intended that the patent shall cover, by summarization in appended claims, all features of patentable novelty residing in the invention.

What is claimed is:

1. In a fluid fuel torch, a normally upright fuel tank; a flexible extension tube at one end connected to and leading from the tank; a burner assembly at and connected to the other end of the extension tube remote from the tank; a support element on the burner assembly; and, rigidly mounted on one side of and extending laterally horizontally away from the fuel tank, a lifting device incorporating a grasping portion spaced horizontally from the tank and, spaced from both the tank and the grasping portion, a receiving element, one of the elements comprising a tube and the other comprising a rod axially slidable into and out of the tube for detachable interfitting engagement, such engagement attaching the burner assembly to the tank in suspended relation to the lifting device, generally below the grasping portion and laterally of the tank for facile removal and replacement.

2. A torch as in claim 1 in which the burner assembly support element comprises an end-mounted member of elongated shape.

3. A torch as in claim 1 in which the rod is of greater length than the tube, the rod having a free end projecting horizontally beyond the tube when the elements are interfittingly engaged.

4. A torch as in claim 3 in which the rod comprises an elongated holding portion having said free end and an attaching portion fast to the burner assembly, said rod portions being parallel to and offset one from the other.

5. A torch as in claim 4 in which the rod support element is mounted on the burner assembly with the holding portion extending parallel to the path of the torch flame projected from the burner assembly.

6. In a fluid fuel torch, a fuel tank; a flexible extension tube at one end connected to and leading from the tank; a burner assembly at and connected to the other end of the extension tube and comprising an elongated support element having a free end; and, rigidly mounted on the fuel tank, a handle of skeleton construction comprising a grasping portion, bars at the ends of and angularly disposed relative to the grasping portion, anchoring portions fast and angularly disposed to the bars at the ends of the latter spaced from the grasping portion, and, fast to the anchoring portions at the ends of the latter remote from the bars, means for attaching the burner assembly support by interfitting engagement with the free end of the support element at a point spaced from both the grasping portion of the handle and the tank.

7. A torch as in claim in which the handle takes the form of a symmetrically bent rod having the grasping portion at the center and end portions which form the bars and the anchoring portions which latter extend downward to an attaching zone below the general horizontal plane of the grasping portion.

8. A torch as in claim 7 in which the anchoring portions of the handle are fast to the fuel tank.

9. A torch as in claim 8 in which, in the attaching zone, the anchoring portions of the handle have integral terminal ends angled outwardly from the fuel tank.

10. A torch as in claim 9 in which the outwardly angled ends of the handle are spaced from one another and joined by a transversely extending receptacle comprising said attaching means for receiving the support of the burner assembly.

11. A torch as in claim 10 in which the receptacle takes the form of a tube having an axial end opening to receive the elongated support element.

12. A handle for a torch or the like of the type having a burner head connected to a fuel supply reservoir by a flexible fuel conduit and having an element fast to the head for supporting the latter, said handle comprising a U-shaped rod having a bight providing a grasping portion and spaced similarly shaped integral side portions extending laterally from opposite ends of the grasping portion, the side portions being adapted to be made fast to the torch reservoir, a tube spaced from and in generally parallel relation to said grasping portion, the rod having integral end portions turned out of the general plane of the grasping and side portions toward a zone spaced therefrom in which they are interconnected by said tube.

13. A fuel reservoir assembly for a torch of the type having a flexible fuel conduit connected at one end to the reservoir and on its other end a burner head with a support element, said reservoir comprising a tank having top, bottom and side walls and, near the top thereof, at least one handle comprising an open ended tube and a U-shaped rod having a central grasping portion and integral end portions extending laterally from the grasping portion, the grasping portion being spaced horizontally from the side wall of the tank, the end portions being below and turned out of the general plane of the grasping portion of the handle toward a zone spaced therefrom in which they are interconnected by said tube, the support element of the head being receivable in the tube through the open end of the latter.

14. A fuel reservoir as in claim 13 in which the end portions of the rod are bonded to the tank between the general plane of the grasping portion and the zone in which they are interconnected by the tube.

15. A fuel reservoir as in claim 14 in which the tube inter-connecting the end portions of the rod extends horizontally.

16. A fuel reservoir as in claim 15 in which the connecting tube is open at both ends.

17. In a fuel torch, a fuel tank; controls on the fuel tank; an extension tube at one end connected to and leading from the controls on the fuel tank; a burner assembly at and connected to the other end of the extension tube; an L-shaped support on the burner assembly, said support having one element fast to the burner assembly and another element spaced from the burner assembly and comprising a free end; and, rigidly mounted on the fuel tank, a lifting device incorporating means for attaching the burner assembly support, said lifting means taking the form of a handle of skeleton construction provided with a U-shaped normally horizontal grasping portion having a central part spaced from the tank and, spaced from the central part of the grasping portion and generally parallel thereto and also spaced from the tank an elongated attaching member for receiving and guiding said other element of the L-shaped support for relative longitudinal movement to predetermined position relative to the tank.

18. A fuel torch as in claim 17 in which the elongated member for attaching the burner assembly support comprises a horizontally extending tube.

19. A fuel torch as in claim 18 in which the horizontally extending tube interconnects the ends of the U-shaped grasping portion in a zone below and spaced from the general plane of the grasping portion.

References Cited in the file of this patent

UNITED STATES PATENTS

| | | |
|---|---|---|
| 717,831 | Filzer | Jan. 6, 1903 |
| 739,221 | Reinlein | Sept. 15, 1903 |
| 1,308,452 | Smock | July 1, 1919 |
| 2,105,522 | Clevenger | Jan. 18, 1938 |
| 2,489,339 | Stroop | Nov. 29, 1949 |
| 2,805,658 | Schlueter | Sept. 10, 1957 |

UNITED STATES PATENT OFFICE
CERTIFICATION OF CORRECTION

Patent No. 2,962,020　　　　　　　　　　November 29, 1960

Robert H. Hunter et al.

It is hereby certified that error appears in the above numbered patent requiring correction and that the said Letters Patent should read as corrected below.

Column 1, line 50, for "On" read -- One --; column 2, line 2, for "etxension" read -- extension --; line 66, after "block" insert -- 9 --; column 3, line 8, for "fastended" read -- fastened --; column 4, line 70, after "claim" insert -- 6 --.

Signed and sealed this 24th day of April 1962.

(SEAL)
Attest:

ESTON G. JOHNSON
Attesting Officer

DAVID L. LADD
Commissioner of Patents